United States Patent
Miller et al.

(10) Patent No.: US 7,432,689 B2
(45) Date of Patent: Oct. 7, 2008

(54) BUCK-BOOST CONTROL LOGIC FOR PWM REGULATOR

(75) Inventors: Ira G. Miller, Tempe, AZ (US); Eduardo Velarde, Chandler, AZ (US)

(73) Assignee: Micrel, Inc., San Jose, CA (US)

( * ) Notice: Subject to any disclaimer, the term of this patent is extended or adjusted under 35 U.S.C. 154(b) by 62 days.

(21) Appl. No.: 11/429,613

(22) Filed: May 5, 2006

(65) Prior Publication Data

US 2007/0273340 A1 Nov. 29, 2007

(51) Int. Cl.
G05F 1/62 (2006.01)
G05F 1/595 (2006.01)
G05F 3/16 (2006.01)

(52) U.S. Cl. .................. 323/259; 323/225; 323/283

(58) Field of Classification Search ........... 323/224, 323/283, 266, 259, 225
See application file for complete search history.

(56) References Cited

U.S. PATENT DOCUMENTS 6,166,527 A * 12/2000 Dwelley et al. ............ 323/222
6,348,781 B1 * 2/2002 Midya et al. ............... 323/224
7,268,525 B2 * 9/2007 Ishii et al. .................. 323/282

* cited by examiner

*Primary Examiner*—Jeffrey L. Sterrett
*Assistant Examiner*—Harry Behm
(74) *Attorney, Agent, or Firm*—Patent Law Group LLP; Brian D. Ogonowsky (57) ABSTRACT

A PWM regulator is operated either a buck mode or a boost mode depending on whether the input voltage is above or below the desired regulated output voltage. The technique uses two sawtooth ramps 180 degrees out of phase. Where the two ramps cross each other is a buck/boost transition level. An error voltage, corresponding to a required duty cycle to achieve a regulated voltage, is compared to the two ramps. The transition from one mode to the other occurs when the error voltage passes the buck/boost transition level of the two ramps. A logic circuit supplies PWM pulses to either buck switching transistors or the boost switching transistors in a power stage of the regulator, depending on the whether the error voltage is above or below the buck/boost transition level, to achieve the regulated voltage.

16 Claims, 7 Drawing Sheets

BUCK-BOOST CONTROL LOGIC FOR PWM REGULATOR

FIELD OF THE INVENTION

This invention relates to switching voltage regulators and, in particular, to a technique for transitioning between a buck mode and boost mode of a pulse width modulated (PWM) regulator.

BACKGROUND

A typical battery operated device, such as a camera, a music player, or other device, may have an operating voltage of, for example, 3.3 volts. The battery used for the device may have a fully charged voltage of, for example, 4.7 volts and eventually discharges down to 2.7 volts over time. A voltage regulator internal to the device regulates the battery voltage to provide a constant operating voltage of 3.3 volts in this example.

A common regulating technique is pulse width modulation (PWM), where a switching transistor switches on and off at a fixed frequency, but at an adjusted duty cycle, so that the average current equals the load current at the desired regulated voltage. The pulses are smoothed by a filter to deliver a DC output voltage. Other PWM regulators use a variable switching frequency.

It is known to provide a combined buck/boost regulator that either steps down or steps up the battery voltage, as needed, to supply the constant operating voltage. Such buck/boost regulators typically compare the input voltage to the output voltage to determine whether to enter the buck mode or boost mode of operation. Using such a technique results in loop instability around the transition point.

Other techniques used for transitioning between buck and boost modes use differential input and output operational amplifiers, which are difficult to stabilize.

What is needed is a robust technique for transitioning between a buck mode and boost mode of a PWM regulator that does not suffer from the drawbacks of the prior art.

SUMMARY

A technique is described for operating a power stage in a PWM regulator in either a buck mode or a burst mode. The technique uses two sawtooth ramps 180 degrees out of phase. Where the two ramps cross each other is a buck/boost transition level.

An error voltage is generated that identifies the required duty cycle in either the buck mode or the boost mode to generate the desired output voltage. The ramps are compared to the error voltage using two comparators 1 and 2. The transition from one mode to the other occurs when the error voltage passes the buck/boost transition level of the two ramps.

Clock signals generated from the ramps are applied to a PWM logic circuit along with the outputs of the comparators. Based on these inputs, the logic circuit supplies PWM pulses to either the buck switching transistors or the boost switching transistors, depending on the whether the error voltage is above or below the buck/boost transition level, to achieve the regulated voltage. Since the circuitry for generating the PWM pulses and the circuitry for determining the operating mode are the same circuit, the regulator is very stable. No additional circuitry is required for determining when to transition between modes.

Variations on this technique can be used for other types of regulators.

BRIEF DESCRIPTION OF THE DRAWINGS

FIG. 4 also illustrates a timing diagram showing the various pulses generated in a buck mode of operation when the error voltage is below the transition level.

Elements with the same numbers in the various figures are the same.

DETAILED DESCRIPTION

Figure 1:
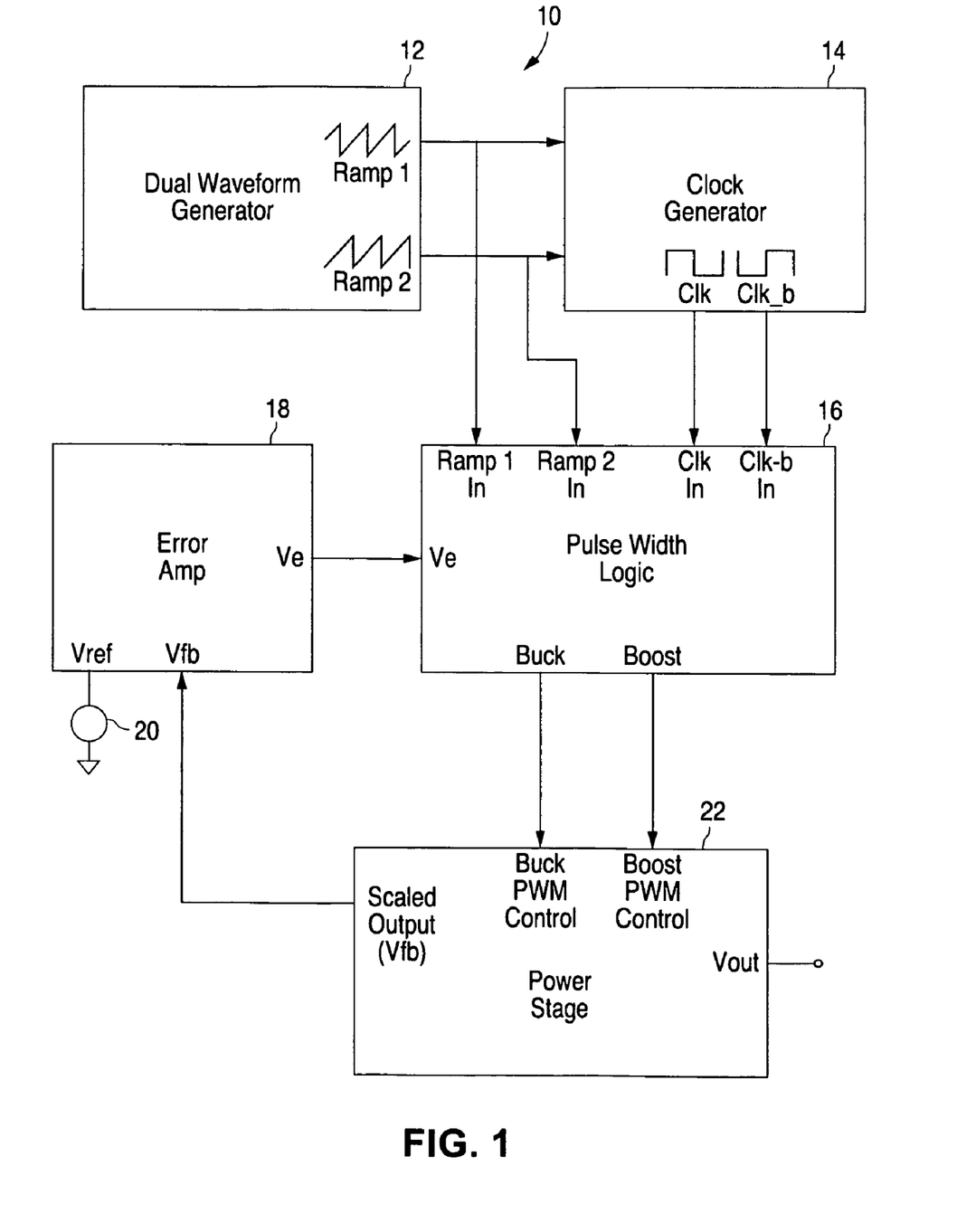
FIG. 1 is a block diagram of one embodiment of the invention.

FIG. 1 illustrates a PWM voltage regulator 10 in accordance with one embodiment of the invention.

Figure 4:
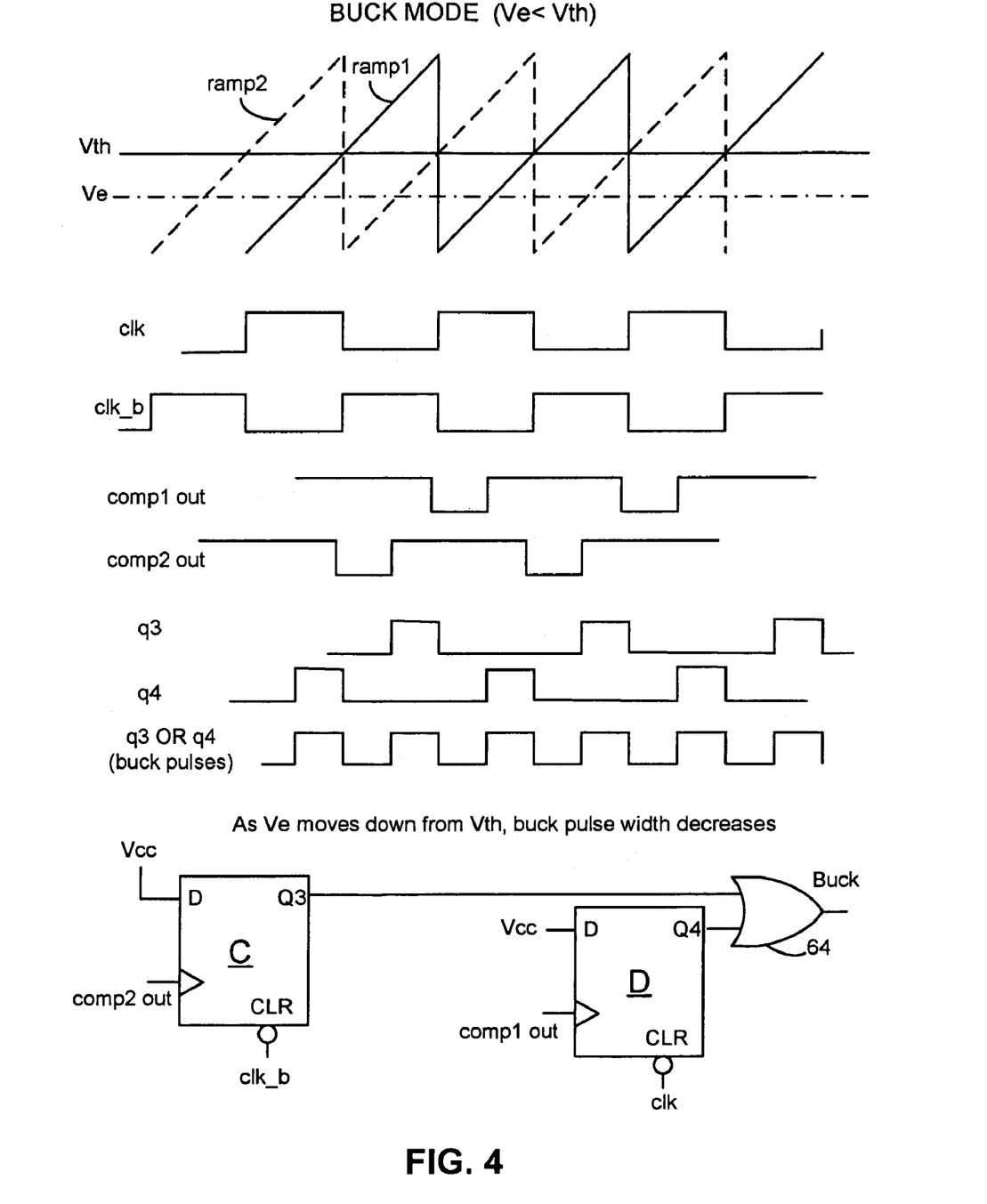
FIG. 4 illustrates two ramps 180 degrees out of phase and a transition level coinciding with the transition between a buck mode and boost mode.
Figure 5:
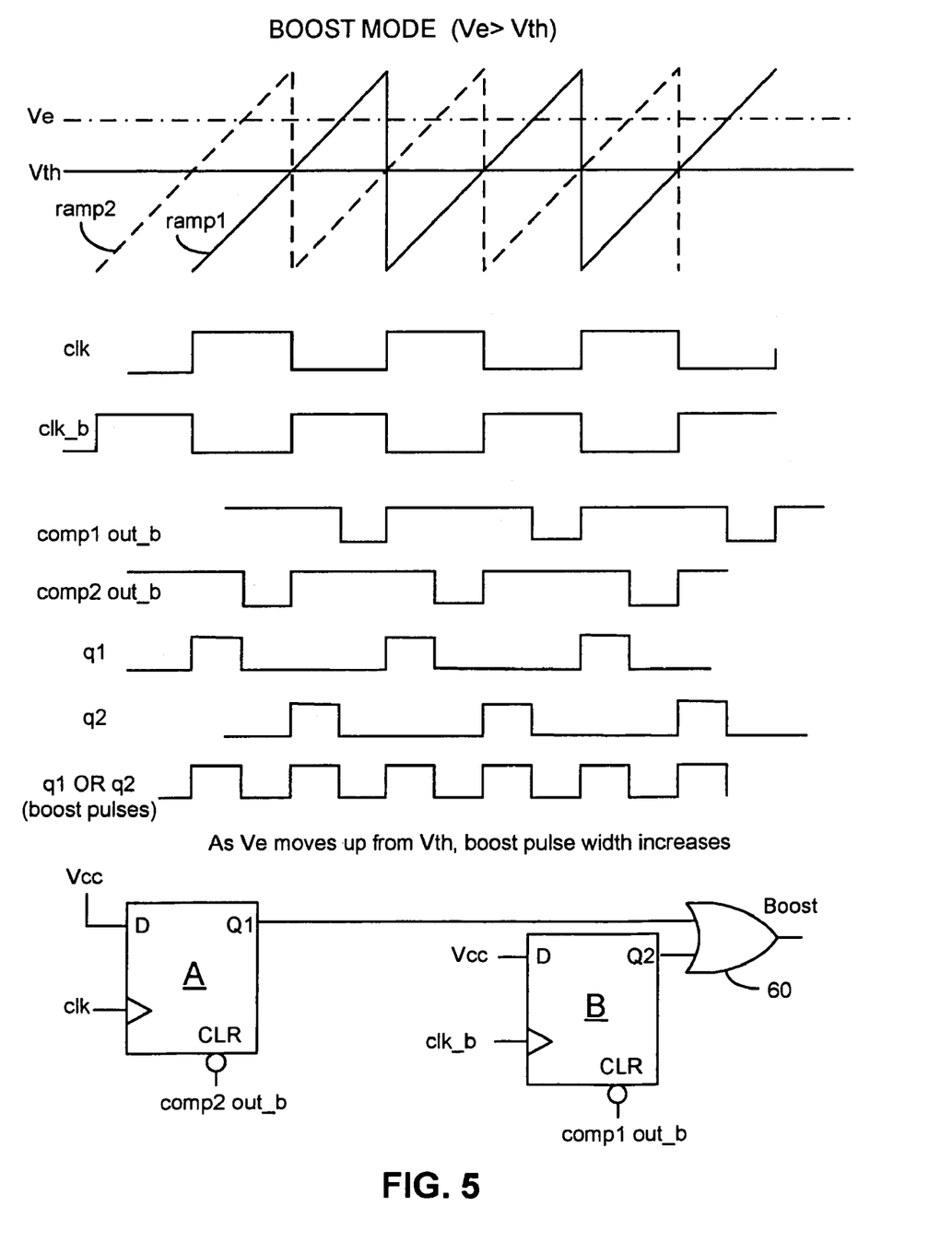
FIG. 5 is similar to FIG. 4 but illustrates a timing diagram showing the various pulses generated in a boost mode of operation when the error voltage is above the transition level.

A dual waveform generator 12 generates sawtooth ramps 1 and 2, 180 degrees out of phase with each other. FIGS. 4 and 5 show the ramps in more detail.

Figure 6:
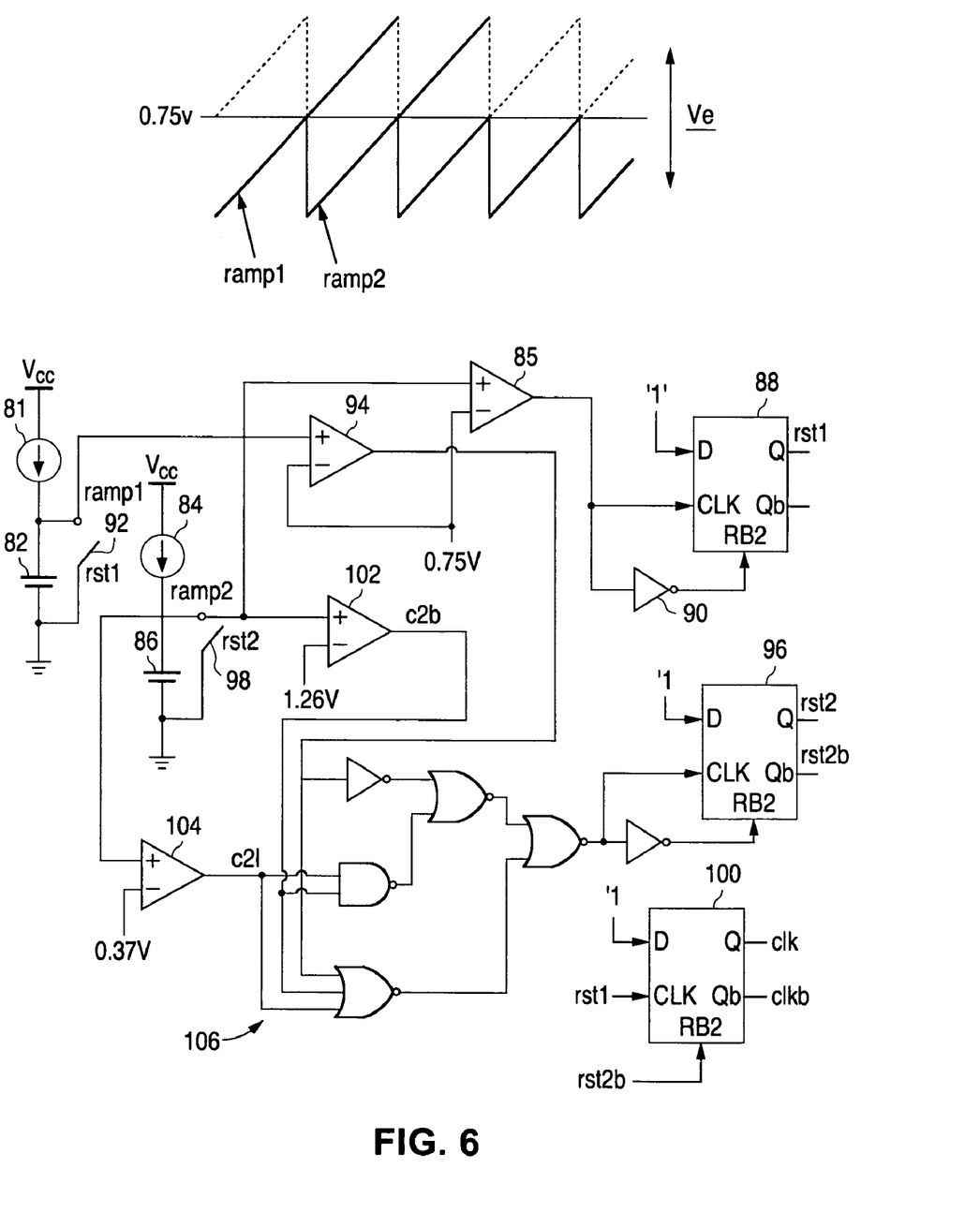
FIG. 6 illustrates one circuit for generating the two ramps and the clock pulses clk and clk_b (inverted clk) so that the ramps and clocks are synchronized.

A clock generator 14 generates square wave clock pulses clk and inverted clk_b pulses from the ramps 1 and 2 so that the clock pulses are synchronized with the ramps. FIG. 6 shows more detail of the clock generator 14. The clk signal goes high when ramp 1 begins, and the clk_b signal goes high when ramp 2 begins. The clk signal goes low when ramp 2 begins, and the clk_b signal goes low when ramp 1 begins. The synchronization of the clock pulses and the ramps are illustrated in FIGS. 4 and 5.

The ramps and clock pulses are applied to the pulse width logic 16. The output (Ve) of an error amplifier 18 is also applied to logic 16. The error amp 16 is a differential amplifier that multiples a difference between a divided output voltage Vfb of the regulator 10 and a reference voltage Vref 20. The magnitude of Ve directly corresponds to the duty cycle of either the buck switching transistors or the boost switching transistors. The feedback loop of the regulator 10 keeps Vfb matched to Vref by adjusting the duty cycle of the buck or boost mode switching transistors.

Figure 3A:
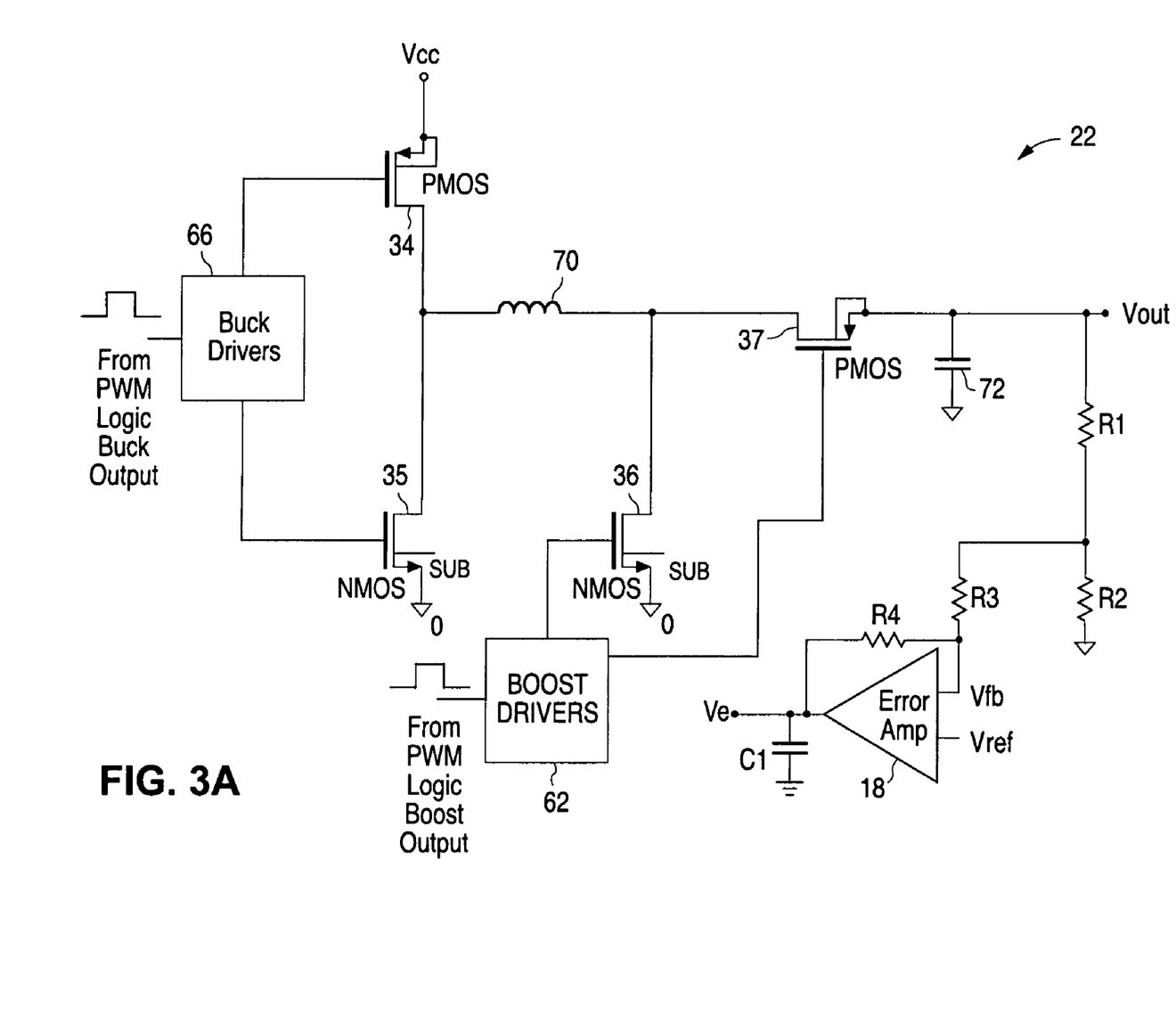
FIG. 3A is a schematic of a power stage of the regulator where buck control switches are synchronously switched in the buck mode, and boost control switches are synchronously switched in the boost mode.

The output signals of the logic 16 are either pulses for controlling the buck switching transistors or pulses for controlling the boost switching transistors in the power stage 22. FIG. 3A shows more detail of the power stage 22. The output of the power stage 22 is the regulated voltage Vout.

The operation of the regulator will be described with reference to the flowchart of FIG. 2 along with the remaining figures.

Figure 2:
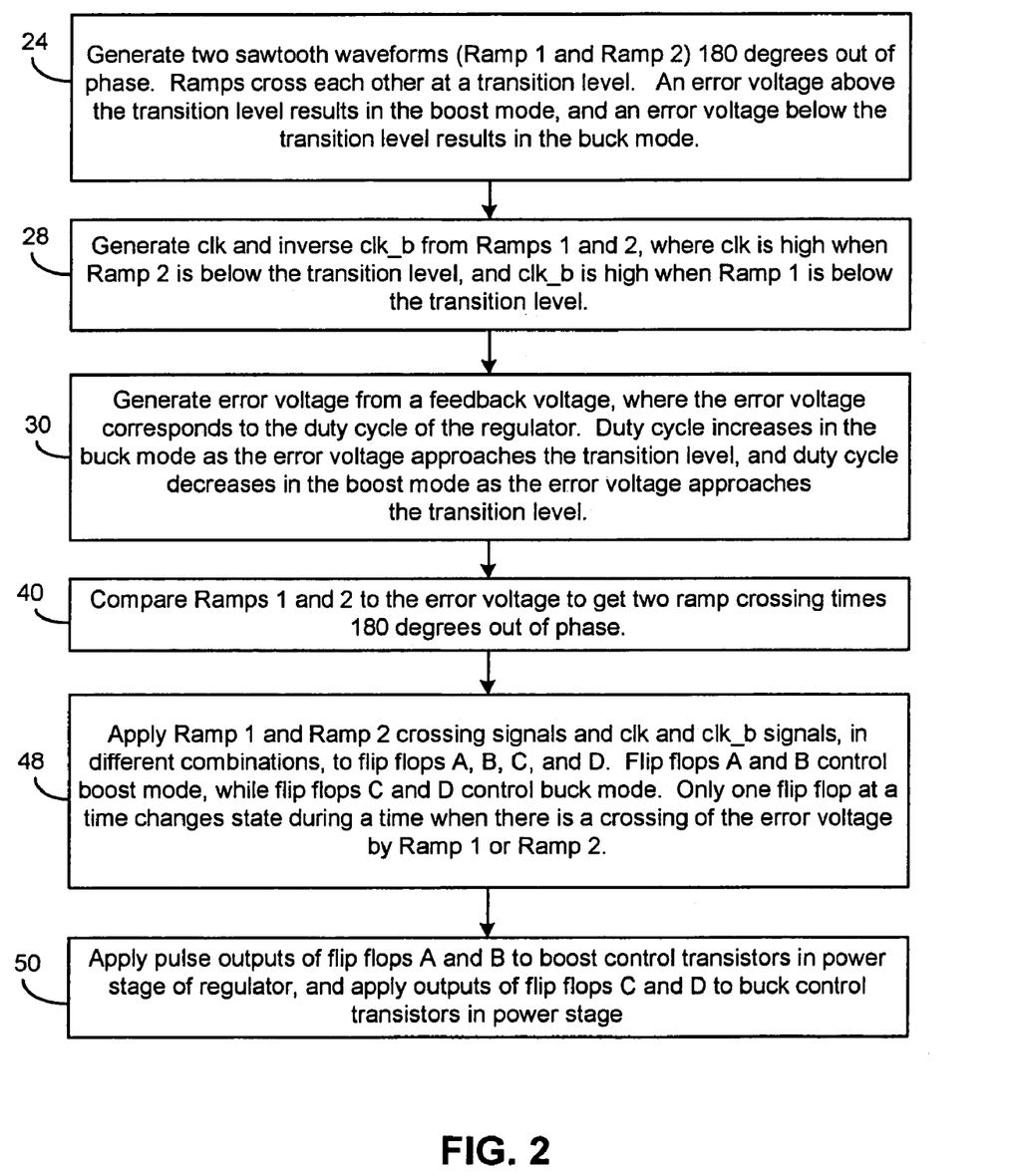
FIG. 2 is a flowchart of basic steps performed by one embodiment of a regulator in accordance with the present invention.

In step 24 of FIG. 2, two sawtooth waveforms, ramp 1 and ramp 2, are generated 180 degrees out of phase. FIG. 6, described later, illustrates how the ramps 1 and 2 may be generated. FIG. 4 illustrates the two ramps. In the regulator example presented herein, the error voltage (Ve) of the error amplifier 18 ranges from 0 to 1.5 volts. Since the mode of operation and the duty cycle is determined by where the error voltage crosses the ramps 1 and 2, the range of ramps 1 and 2 is also set to 0 to 1.5 volts.

A Ve threshold level of 0.75 volts identifies the transition point between the buck mode and boost mode. Any crossing of Ve by either ramp 1 or ramp 2 below the threshold level will result in only the buck mode switching transistors switching, and any crossing of Ve by either ramp 1 or ramp 2 above the threshold level will result in only the boost mode switching transistors switching.

In step 28 of FIG. 2, the clock signals clk and the inverted clk_b signals are generated. FIG. 6 illustrates how the clock signals may be generated from the ramps 1 and 2. FIGS. 4 and 5 illustrate the correspondence of the clock signals to ramps 1 and 2.

In step 30, an error voltage (Ve) is generated that is used to control the duty cycle of the buck or boost mode switching transistors. FIG. 3A shows the error amplifier 18, connected to the power stage 22, receiving a divided output (Vfb) of the regulator output voltage (Vout) and a fixed reference voltage Vref. Resistors R1 and R2 divide Vout. Resistors R3 and R4 set the gain of the error amplifier 18. The error amplifier 18 adds or removes charge from capacitor C1 depending on the difference between Vfb and Vref. The feedback path of the regulator adjusts Vout based on Ve in order to match Vfb to Vref. If Vfb is too high, charge is removed from C1 to lower Ve and thus lower the duty cycle (assuming the modes have not changed). If Vfb is too low, charge is added to C1 to increase Ve and thus raise the duty cycle (assuming the modes have not changed). C1 may be internal to the error amplifier circuit.

A Ve of 0-0.75 volts (i.e., below the transition level) varies the duty cycle of the buck mode switching transistors 34 and 35 in FIG. 3A between 0% and 100%, depending on the magnitude of Ve. A Ve of 0.75-1.5 volts (i.e., above the transition level) varies the duty cycle of the boost mode switching transistors 36 and 37 in FIG. 3A between 0% and 100%, depending on the magnitude of Ve. This is discussed in greater detail later.

Figure 3B:
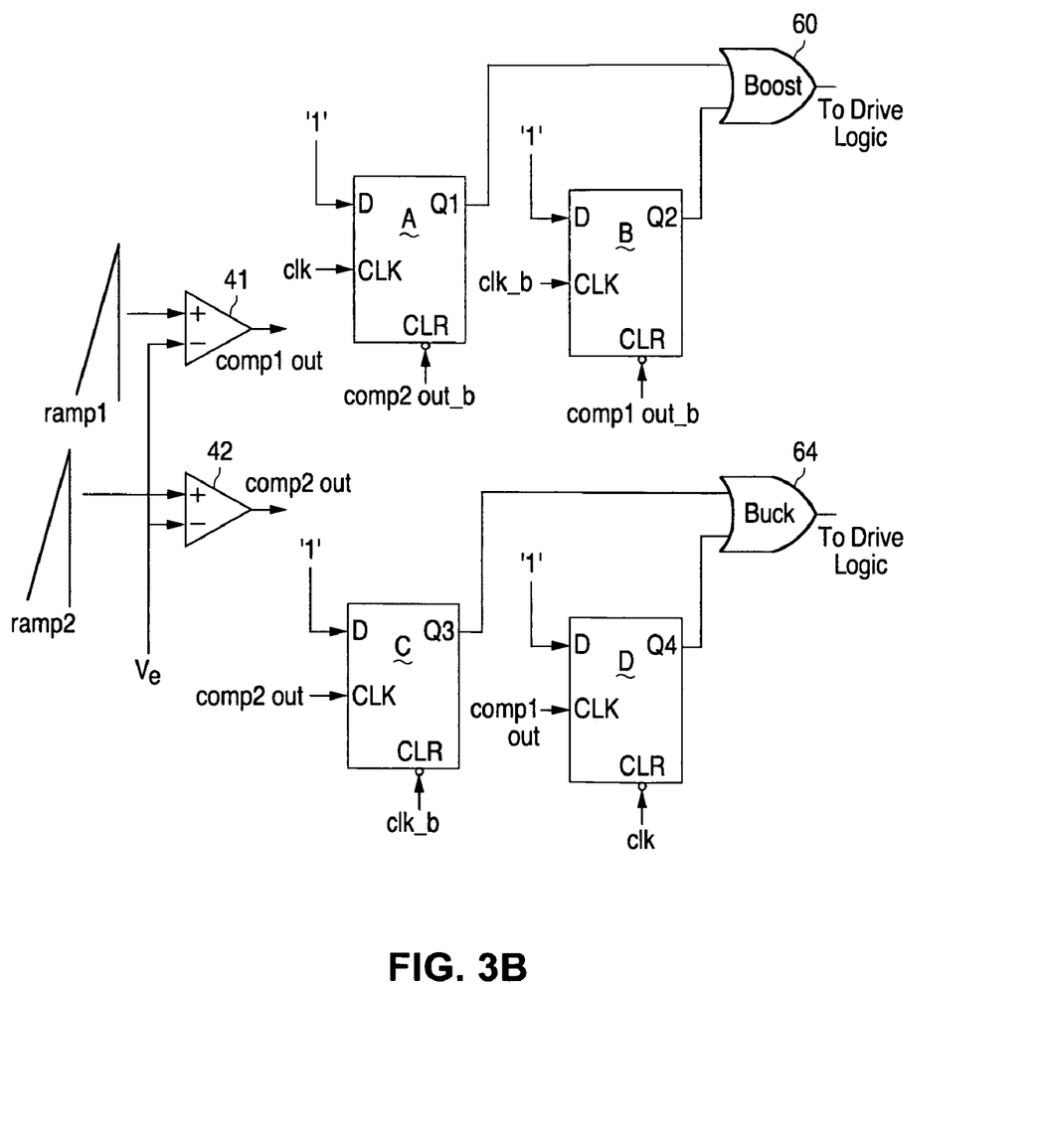
FIG. 3B is a logic block diagram of the logic used to both control the switches in the power stage of FIG. 3B and transition between the buck and boost modes.

In step 40 of FIG. 2, ramp 1 is compared to Ve by comparator 41 in FIG. 3B, and ramp 2 is compared to Ve by comparator 42 in FIG. 3B. The comparators 41 and 42 are high gain differential amplifiers. The output of comparator 41 will be high as long as ramp 1 is greater than Ve. The output of comparator 42 will be high as long as ramp 2 is greater than Ve. Otherwise, the outputs of the comparators are low. Since the ramps 1 and 2 are out of phase, the crossing times will be similarly out of phase.

Step 48 of FIG. 2 relates to the pulse width logic 16 of FIG. 3B. In FIG. 3B, each of the D-type flip flops A-D have the following truth table, given that the D input of each flip flop is fixed at a high, or logic 1, level. A logic 0 signal applied to the CLR (clear) pin forces the output Q to be a logic 0. If the signal applied to the CLR pin is a logic 1, then the output Q will follow the CLK pin input.

| CLK pin | CLR pin | Q |
|---------|---------|---|
| 1 | 0 | 0 |
| 0 | 0 | 0 |
| 1 | 1 | 1 |
| 0 | 1 | 0 |

Clock pulses clk are applied to the CLK pin of flip flop A and to the CLR pin of flip flop D. Clock pulses clk_b are applied to the CLK pin of flip flop B and to the CLR pin of flip flop C. The output of comparator 41 (signal comp1 out) is applied to the CLK pin of flip flop D and to the CLR pin of flip flop B. The output of comparator 42 (signal comp2 out) is applied to the CLK pin of flip flop C and to the CLR pin of flip flop A. Many other types of logic circuits can be used to achieve the same logic result, as would be understood by those skilled in the art.

The timing of the crossing point for the comparators 41 and 42 determines whether the regulator operates in the buck mode or boost mode and the duty cycle of the switching transistors in the power stage.

In step 50 of FIG. 2, the outputs of flip flops A and B are connected to inputs of an OR gate 60, whose output is connected to boost drivers 62 in the power stage of FIG. 3A. The boost drivers 62 provide the boost control switching signals for transistors 36 and 37 in FIG. 3A as well as any suitable delay to avoid cross conduction of the power transistors. The outputs of flip flops C and D are connected to inputs of an OR gate 64, whose output is connected to buck drivers 66 in FIG. 3A. The buck drivers 66 provide the buck control switching signals for transistors 34 and 35 in FIG. 3A as well as any delay to avoid cross conduction.

The signals applied to the flip flops A-D cause only one flip flop output Q at a time to be a logic 1. The remaining flip flops have either a logic 0 applied to the CLR pin (forces a logic 0 output) or a logic 0 applied to the CLK pin (generates a logic 0 output).

For controlling the power stage to operate in the buck or boost mode and for switching the various transistors to regulate the output voltage of the regulator, the following takes place. For controlling the regulator in the buck mode, the boost PMOS transistor 37 is left on, and the boost NMOS transistor 36 is left off. This is accomplished by the boost drivers 62 outputting a low drive signal when the boost OR gate 60 outputs a low signal. This causes the boost transistors to have no effect on the buck mode of operation. The buck transistors 34 and 35 are then synchronously switched by the pulses from the buck OR gate 64 at a duty cycle to regulate the output voltage to be a predetermined level somewhere at or below the power supply voltage, such as from a battery.

For controlling the regulator in the boost mode, the buck PMOS transistor 34 is left on, and the buck NMOS transistor 35 is left off. This is accomplished by the buck drivers 66 outputting a low drive signal when the buck OR gate 64 outputs a low signal. This causes the buck transistors to have no effect on the boost mode of operation. The boost transistors 36 and 37 are then synchronously switched by the pulses from the boost OR gate 60 at a duty cycle to regulate the output voltage to be a predetermined level somewhere above the power supply voltage.

FIG. 4 shows examples of the various signals generated by the PWM logic circuit 16 when Ve is below the transition (or threshold) level, labeled Vth. The signals comp1 out and comp2 out are the signals from the comparators 41 and 42, respectively. The signals q3 and q4 are the signals from the Q3 and Q4 pins of the buck flip flops C and D, shown in FIG. 3B and reproduced in FIG. 4. During the time the regulator is operating in the buck mode, the Q1 and Q2 signals from the boost flip flops A and B are zero. When the output of the buck OR gate 64 is low, the PMOS transistor 34 (FIG. 3A) turns on to charge the inductor 70 in FIG. 3A, while the NMOS transistor 35 is off, and the output capacitor 72 provides filtering to supply a constant voltage and current to the load connected to Vout. When the output of OR gate 64 is high, the PMOS transistor 34 turns off, and the NMOS transistor 35 turns on to discharge the inductor 70. The charging and discharging of the inductor 70 generates a triangular current through inductor 70, while the output capacitor 72 provides filtering to create a DC output voltage.

As Ve rises toward the transition level Vth, the widths of the pulses decrease, and the buck mode duty cycle increases. When Ve equals the transition level Vth, the duty cycle is 100%, so PMOS transistor 34 is on the entire cycle.

FIG. 5 shows examples of the various signals generated by the PWM logic circuit 16 when Ve is above the transition (or threshold) level, labeled Vth. The signals q1 and q2 are the signals from the Q1 and Q2 pins of the boost flip flops A and B, shown in FIG. 3B and reproduced in FIG. 5. During the time the regulator is operating in the boost mode, the Q3 and Q4 signals from the buck flip flops C and D are zero. When the output of the boost OR gate 60 is high, the NMOS transistor 36 (FIG. 3A) turns on to charge the inductor 70 in FIG. 3A, while the PMOS transistor 37 is off, and the output capacitor 72 provides filtering to supply a constant voltage and current to the load connected to Vout. When the output of OR gate 60 is low, the NMOS transistor 36 turns off, and the PMOS transistor 37 turns on to discharge the inductor 70. The charging and discharging of the inductor 70 generates a triangular current through inductor 70, while the output capacitor 72 provides filtering to create a DC output voltage.

As Ve rises away from the transition level Vth, the widths of the pulses increase, and the boost mode duty cycle increases.

Using the same logic circuitry to control the duty cycle and operating mode is inherently more stable than using separate circuits, thus resulting in a robust and efficient buck/boost regulator.

Other types of gates, flip flops, connections, logic levels, and logic circuitry may be used to achieve the equivalent logic operation where the operating mode and the PWM pulses are generated using the same circuitry. For example, certain signals may be inverted and applied to the CLK pin of the flip flops instead of to the CLR pin, and visa versa. Many types of well known design programs may be used to create logic circuits that perform equivalent logic operations, and all such equivalent logic circuits are understood to be encompassed by the present invention.

Additionally, instead of PMOS and NMOS switching transistors, all transistors may be of the same type or may be bipolar. This may require the logic levels of some PWM pulse trains in FIGS. 4 and 5 to be inverted or require the drivers to provide an inverted drive signal to certain transistors. Transistors 35 and 37 may be diodes instead of transistors.

Various types of well known power stage configurations may be used to generate a regulated voltage given step down (buck) mode and step up (boost) mode PWM signals. The terms buck and boost are intended to refer to any type of step down and step up regulation configurations.

Ramp and Clock Signal Generation

Although many types of circuits may be used to generate ramp 1 and ramp 2 and the clock signals clk and clk_b, a particularly innovative circuit for generating these signals is shown in FIG. 6.

In the example of FIG. 6, the transition level is 0.75 volts, corresponding to where the ramps cross. To generate ramp 1, a current source 80 is connected between a voltage source Vcc and a capacitor 82. As the capacitor 82 is charged, its voltage (ramp 1) will ramp up. The current source magnitude or the capacitance value is selected to generate a ramp with a necessary rise time to achieve the desired switching frequency of the switching transistors. In one embodiment, the switching frequency is set to between 100 KHz and 1 MHz.

Ramp 2 is generated using current source 84 and capacitor 86. When ramp 2 reaches 0.75, as detected by a comparator 85, the comparator 85 applies a logic 1 clock signal to the CLK input of D-flip flop 88 to cause the Q pin to output a logic 1 reset signal (rst1). The D-inputs of all the flip flops are tied to a logic 1 signal. The comparator 85 output is also inverted and slightly delayed by inverter 90 and applied to a reset pin (RB2) of flip flop 88. A logic 0 signal to the RB2 pin resets the flip to a zero output. Since the input to RB2 is a delayed logical 0, the flip flop 88 outputs a short pulse when comparator 85 is triggered. The rst1 pulse is applied to a reset switch 92 that quickly discharges the capacitor 82, then reopens, to cause the ramp 1 signal to start again from 0 volts.

Similarly, the ramp 2 is reset when ramp 1 exceeds 0.75 volts, as determined by comparator 94. Through various logic gates, the comparator 94 signal is applied to the CLK pin of flip flop 96 to generate a pulsed rst2 signal when ramp 1 exceeds 0.75 volts. This momentarily turns on a reset switch 98 that quickly discharges the capacitor 86 to cause the ramp 2 signal to start again from 0 volts.

By toggling the flip flop 88 and 96 outputs, the ramps 1 and 2 are alternately reset when the other ramp reaches the transition level (0.75 volts).

The Qb (inverted Q) signal of flip flop 96 generates a rst2b signal, which is an inverted rst2 signal.

The rst1 signal is then applied to the CLK pin of a third flip flop 100, and the rst2b signal is applied to the RB2 pin of flip flop 100. Flip flop 100 outputs clk and clkb signals synchronized with the ramps 1 and 2. The various signals are then applied to the PWM logic of FIG. 3B along with the error voltage to control the regulator.

Additional logic circuitry is used in FIG. 6 to initially start up the circuit when both the capacitors 82 and/or 86 are concurrently either fully discharged or fully charged. At least one ramp needs to be ramping up for the various logic transitions to take place, and both ramps cannot both be above or below 0.75 volts at the same time for proper operation. If it is detected that ramp 1 is greater than 0.75 volts and ramp2 is greater than 1.26 volts, as detected by comparators 94 and 102, then the circuit needs to be reset. In such a case, the logic 106 generates a rst2 pulse to reset ramp 2. This will cause the circuit of FIG. 6 to begin normal operation. Conversely, if it is detected that ramp 1 is less than 0.75 volts and ramp2 is less than 0.37 volts, as detected by comparators 94 and 104, then the circuit needs to be reset. In such a case, the logic 106 generates a rst2 pulse to reset ramp 2. This will cause the circuit of FIG. 6 to begin normal operation. Various other logic techniques may also be used for start up.

The entire regulator circuit, except for the filters in the power stage, may be formed as a single integrated circuit.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A switching voltage regulator that operates in buck and boost modes comprising:

a dual ramp generator that generates a first ramp waveform and an identical second ramp waveform at a certain frequency, the first ramp waveform being 180 degrees out of phase with the second ramp waveform, the first ramp waveform and the second ramp waveform having a same voltage at a transition level;

a clock generator for generating a clock signal and an inverted clock signal having a period equal to a period of the first ramp waveform;

an error amplifier receiving a feedback voltage corresponding to an output of the regulator and receiving a reference voltage, an output of the error amplifier being an error signal corresponding to a duty cycle needed to switch at least one buck switching transistor in a power stage, for generating a regulated voltage lower than an input voltage, or switch at least one boost switching transistor in the power stage, for generating a regulated voltage higher than an input voltage, in order to maintain the feedback voltage substantially matching the reference voltage; and an arrangement of logic circuits receiving the first ramp waveform, the second ramp waveform, the clock signal, the inverted clock signal, and the error signal, the arrangement of logic circuits being configured to output either pulse width modulated (PWM) buck control pulses for controlling the at least one buck switching transistor or PWM boost control pulses for controlling the at least one boost switching transistor based on whether the error voltage crosses the first ramp waveform and the second ramp waveform above or below the transition level;

wherein the logic circuits comprise a first comparator comparing the first ramp waveform to the error voltage to generate a first comparator signal, and a second comparator comparing the second ramp waveform to the error voltage to generate a second comparator signal;

wherein the logic circuits further comprise a plurality of flip flops coupled to signals corresponding to the first comparator signal, the second comparator signal, the clock signal, and the inverted clock signal so as to either output PWM buck control pulses or PWM boost control pulses;

wherein only one flip flop at a time outputs PWM buck control pulses or PWM boost control pulses;

wherein a first flip flop receives the clock signal and a signal corresponding to the second comparator signal, a second flip flop receives the inverted clock signal and a signal corresponding to the first comparator signal, a third flip flop receives the inverted clock signal and a signal corresponding to the second comparator signal, and a fourth flip flop receives the clock signal and a signal corresponding to the first comparator signal; and wherein the first flip flop and the second flip flop generate PWM boost control pulses, and the third flip flop and the fourth flip flop generate PWM buck control pulses.

2. The regulator of claim 1 further comprising a power stage comprising at least one buck switching transistor for being controlled at a duty cycle for generating a regulated voltage at an output of the regulator lower than an input voltage, and comprising at least one boost switching transistor for being controlled at a duty cycle for generating a regulated voltage at the output of the regulator higher than the input voltage.

3. The regulator of claim 2 wherein the at least one buck switching transistor comprises a high side buck transistor, connected between the input voltage and a first terminal of an inductor, and a low side buck transistor, connected between the first terminal of the inductor and ground, and wherein the at least one boost switching transistor comprises a high side boost transistor, connected between a second terminal of the inductor and an output of the regulator, and a low side boost transistor, connected between the second terminal of the inductor and ground.

4. The regulator of claim 1 wherein the regulator is formed as a single integrated circuit.

5. The regulator of claim 1 wherein the transition level has a magnitude approximately equal to half of a magnitude of the first ramp waveform and the second ramp waveform.

6. The regulator of claim 1 the first ramp waveform and the second waveform are identical except for being 180 degrees out of phase.

7. The regulator of claim 1 further comprising a power stage comprising at least one buck switching transistor for being controlled at a duty cycle for generating a regulated voltage at an output of the regulator lower than an input voltage, and comprising at least one boost switching transistor for being controlled at a duty cycle for generating a regulated voltage at the output of the regulator higher than the input voltage, either the at least one buck switching transistor or the at least one boost switching transistor, depending on whether the error voltage crosses the first ramp waveform and the second ramp waveform above or below the transition level, being controlled by PWM pulses generated by the arrangement of logic circuits to intermittently charge an inductor, wherein an average current conducted by the inductor equals a current to a load connected to the output of the regulator.

8. The regulator of claim 1 wherein a determination of whether to operate the power stage in a buck mode or a boost mode and the control of the duty cycle of the PWM buck control pulses and PWM boost control pulses are performed by the same logic circuits so that no additional circuitry is used to determine whether to operate the power stage in the buck mode or the boost mode.

9. A switching voltage regulator that operates in buck and boost modes comprising:

a dual ramp generator that generates a first ramp waveform and an identical second ramp waveform at a certain frequency, the first ramp waveform being 180 degrees out of phase with the second ramp waveform, the first ramp waveform and the second ramp waveform having a same voltage at a transition level;

a clock generator for generating a clock signal and an inverted clock signal having a period equal to a period of the first ramp waveform;

an error amplifier receiving a feedback voltage corresponding to an output of the regulator and receiving a reference voltage, an output of the error amplifier being an error signal corresponding to a duty cycle needed to switch at least one buck switching transistor in a power stage, for generating a regulated voltage lower than an input voltage, or switch at least one boost switching transistor in the power stage, for generating a regulated voltage higher than an input voltage, in order to maintain the feedback voltage substantially matching the reference voltage; and an arrangement of logic circuits receiving the first ramp waveform, the second ramp waveform, the clock signal, the inverted clock signal, and the error signal, the arrangement of logic circuits being configured to output either pulse width modulated (PWM) buck control pulses for controlling the at least one buck switching transistor or PWM boost control pulses for controlling the at least one boost switching transistor based on whether the error voltage crosses the first ramp waveform and the second ramp waveform above or below the transition level;

wherein the dual ramp generator comprises:

a first current source connected between a voltage source and a first terminal of a first capacitor for charging the first capacitor;

a first momentary shorting switch connected between the first terminal and ground for discharging the first capacitor, a voltage across the first capacitor being the first ramp waveform;

a second current source connected between the voltage source and a second terminal of a second capacitor for charging the second capacitor;

a second momentary shorting switch connected between the second terminal and ground for discharging the second capacitor, a voltage across the second capacitor being the second ramp waveform;

a first comparator comparing the first ramp waveform to a first voltage equal to one half of a full magnitude of the first ramp waveform;

a second comparator comparing the second ramp waveform to the first voltage;

an output of the second comparator being coupled to the first momentary shorting switch for controlling the first momentary shorting switch to be momentarily closed when the second ramp waveform crosses the first voltage; and an output of the first comparator coupled to the second momentary shorting switch for controlling the second momentary shorting switch to be momentarily closed when the first ramp waveform crosses the first voltage.

10. The regulator of claim 9 further comprising logic circuitry coupled to determine if both the first ramp waveform and the second ramp waveform are above or below the transition level at the same time and, if so, to trigger one of the first momentary shorting switch or the second momentary shorting switch to reset the dual ramp generator.

11. The regulator of claim 10 further comprising a flip flop that receives signals corresponding to triggering signals for the first momentary shorting switch and the second momentary shorting switch and, in response, generates the clock signal and the inverted clock signal.

12. A method for generating pulse width modulated (PWM) buck control signals or boost control signals for a buck-boost switching voltage regulator comprising:

generating a first ramp waveform and an identical second ramp waveform at a certain frequency, the first ramp waveform being 180 degrees out of phase with the second ramp waveform, the first ramp waveform and the second ramp waveform having a same voltage at a transition level;

generating a clock signal and an inverted clock signal having a period equal to a period of the first ramp waveform;

generating an error voltage by an error amplifier receiving a feedback voltage corresponding an output of the regulator and receiving a reference voltage, an output of the error amplifier being the error signal, corresponding to a duty cycle needed to switch at least one buck switching transistor in a power stage or at least one boost switching transistor in the power stage in order to maintain the feedback voltage substantially matching the reference voltage; and generating either pulse width modulated (PWM) buck control pulses for controlling the at least one buck switching transistor, for generating a regulated voltage at an output of the regulator lower than an input voltage, or PWM boost control pulses for controlling the at least one boost switching transistor, for generating a regulated voltage at an output of the regulator higher than an input voltage, based on whether the error voltage crosses the first ramp waveform and the second ramp waveform above or below the transition level, the PWM buck or boost control signals being generated by an arrangement of logic circuits receiving the first ramp waveform, the second ramp waveform, the clock signal, the inverted clock signal, and the error signal, such that the same arrangement of logic circuits determines whether to output the buck control pulses or the boost control pulses and also determines the duty cycle of the pulse widths to achieve a regulated voltage, wherein generating either pulse width modulated (PWM) buck control pulses or PWM boost control pulses comprises:

comparing the first ramp waveform to the error voltage to generate a first comparator signal, and comparing the second ramp waveform to the error voltage to generate a second comparator signal;

applying the clock signal and a signal corresponding to the second comparator signal to a first flip flop;

applying the inverted clock signal and a signal corresponding to the first comparator signal to a second flip flop;

applying the inverted clock signal and a signal corresponding to the second comparator signal to a third flip flop; and applying the clock signal and a signal corresponding to the first comparator signal to a fourth flip flop, wherein the first flip flop and the second flip flop generate PWM boost control pulses, and the third flip flop and the fourth flip flop generate PWM buck control pulses.

13. The method of claim 12 wherein the at least one buck switching transistor comprises a high side buck transistor connected between the input voltage and a first terminal of an inductor, and a low side buck transistor connected between the first terminal of the inductor and ground, and wherein the at least one boost switching transistor comprises a high side boost transistor connected between a second terminal of the inductor and an output of the regulator, and a low side boost transistor connected between the second terminal of the inductor and ground.

14. The method of claim 12 wherein generating a first ramp waveform and an identical second ramp waveform comprises the transition level having a magnitude approximately equal to half of a magnitude of the first ramp waveform and the second ramp waveform.

15. The method of claim 12 wherein generating a first ramp waveform and an identical second ramp waveform comprises the first ramp waveform and the second waveform being identical except for being 180 degrees out of phase.

16. A switching voltage regulator that operates in buck and boost modes comprising:

a dual ramp generator that generates a first ramp waveform and a second ramp waveform at a certain frequency, the first ramp waveform being 180 degrees out of phase with the second ramp waveform;

a clock generator for generating a clock signal and an inverted clock signal having a period equal to a period of the first ramp waveform;

an error amplifier receiving a feedback voltage corresponding to an output of the regulator and receiving a reference voltage, an output of the error amplifier being an error signal;

an arrangement of logic circuits receiving the first ramp waveform, the second ramp waveform, the clock signal, the inverted clock signal, and the error signal, the arrangement of logic circuits being configured to output either pulse width modulated (PWM) buck control pulses for controlling at least one buck switching transistor in a power stage, for generating a regulated voltage lower than an input voltage, or PWM boost control pulses for controlling at least one boost switching transistor in the power stage, for generating a regulated voltage higher than an input voltage, based on whether the error voltage crosses the first ramp waveform and the second ramp waveform above or below a transition level, wherein the dual ramp generator comprises:

a first current source connected between a voltage source and a first terminal of a first capacitor for charging the first capacitor;

a first momentary shorting switch connected between the first terminal and ground for discharging the first capacitor, a voltage across the first capacitor being the first ramp waveform;

a second current source connected between the voltage source and a second terminal of a second capacitor for charging the second capacitor;

a second momentary shorting switch connected between the second terminal and ground for discharging the second capacitor, a voltage across the second capacitor being the second ramp waveform;

a first comparator comparing the first ramp waveform to a first voltage equal to one half of a full magnitude of the first ramp waveform;

a second comparator comparing the second ramp waveform to the first voltage;

an output of the second comparator being coupled to the first momentary shorting switch for controlling the first momentary shorting switch to be momentarily closed when the second ramp waveform crosses the first voltage; and an output of the first comparator coupled to the second momentary shorting switch for controlling the second momentary shorting switch to be momentarily closed when the first ramp waveform crosses the first voltage, and wherein the clock generator comprises:

a flip flop that receives signals corresponding to triggering signals for the first momentary shorting switch and the second momentary shorting switch and, in response, generates the clock signal and the inverted clock signal.

* * * * *